March 26, 1968     J. D. WEBSTER     3,374,894

SEPARATING DEVICE FOR LIQUID FUEL AND WATER MIXTURES

Filed July 12, 1966

*INVENTOR.*
JOHN D. WEBSTER

BY *J. M. Carson, Jr.*
ATTORNEY

United States Patent Office 3,374,894
Patented Mar. 26, 1968

3,374,894
SEPARATING DEVICE FOR LIQUID FUEL
AND WATER MIXTURES
John D. Webster, 5532 Janet Drive,
Norfolk, Va. 23513
Filed July 12, 1966, Ser. No. 564,699
10 Claims. (Cl. 210—257)

ABSTRACT OF THE DISCLOSURE

A device for separating liquid fuel and water consisting of a container in which the water level is maintained substantially constant by providing a water outlet in the side but below the fuel outlet. The mixture enters a central tubular member, flows across and through an inclined perforated baffle with the water settling to the lower section of the container while the fuel rises and is discharged at the upper fuel outlet.

---

This invention relates generally to a device for separating liquid fuel and water mixtures, and more particularly to a device in which an incoming flow of a mixture of liquid fuel and water is automatically and continuously separated and then discharged therefrom as separate flows of liquid fuel and water.

Devices previously provided for the purpose of separating liquid fuel and water mixtures generally include a porous filter element through which liquid fuel may readily flow but which bars the passage of water, as well as other liquid or solid substances existing as impurities in the liquid fuel and water mixture. Such filter elements must be periodically removed from the device and cleaned or replaced, and during the time required to accomplish this operation, which depends to a degree on the complexity of the filter device and its accessibility in the system in which it is placed, the filter device is unuseable.

Other prior art devices for separating liquid fuel and water mixtures include a large tank into which the mixture is pumped and then allowed to stand while water, which is generally heavier than liquid fuel, settles through the liquid fuel and collects in the bottom of the tank below the liquid fuel. The liquid fuel is then discharged from the tank through a conduit disposed above the upper level of the body of water filling the lower portion of the tank, which may subsequently be drained from the tank through a separate conduit disposed adjacent the lower extremity thereof. The separation of liquid fuel and water mixtures in such devices involves a considerable expenditure of time, however, and although the time required may be reduced by such expedients as the suitable application of heat, generally requiring the constant attention of a human operator, such devices are still considered unsuitable for many uses.

Many of the disadvantages of prior art devices such as those mentioned hereinbefore are largely eliminated in the presently disclosed device for separating liquid fuel and water mixtures, which may be fabricated in a wide range of sizes with only minor modification for automatically, continuously, and rapidly separating small to large flows of liquid fuel mixed with water, and which may be used in a wide variety of applications.

Accordingly, an object of the present invention is the provision of a simple and inexpensive device for continuously separating liquid fuel and water mixtures.

Another object of the instant invention is the provision of a continuously operative device for rapidly separating flowing mixtures of liquid fuel and water.

A further object of the present invention is the provision of a device requiring little or no maintenance and automatically operable for continuously and rapidly separating flowing liquid fuel and water mixtures.

According to the instant invention, the foregoing and other objects are attained by providing a device in the form of a container adapted to hold liquids and having a removeable cover element, a vertical tubular member centrally disposed within the container having an open upper end substantially abutting the container cover element and having an open lower end spaced a distance above the bottom of the container, and a tubular intake conduit extending through a side wall of the container and connected to a side wall of the vertical tubular member for fluid communication with the interior thereof. The device further includes a perforated diaphragm transversely disposed in the vertical tubular member in a sloping attitude; the uppermost extremity of the upper surface of the diaphragm being situated adjacent the intake conduit. The device also includes at least one liquid fuel output conduit extending through a side wall of the container and connected to a side wall of the vertical tubular member for fluid communication with the interior thereof adjacent the lowermost extremity of the upper surface of the perforated diaphragm, as well as a water output conduit connected to a side wall of the container for fluid communication with the interior thereof at a level somewhat below the liquid fuel output conduit. Water fills the device both interiorly and exteriorly of the vertical tubular member to about the level of the water output conduit during operation, while liquid fuel fills the vertical tubular member between the upper level of this body of water and the perforated diaphragm. A mixture of liquid fuel and water flowing into the device through the intake conduit spreads partially over the perforated diaphragm and passes through certain of the perforations thereof nearest the intake conduit and into the body of liquid fuel in the vertical tubular member; the perforated diaphragm assuring dispersed and nonturbulent entry of the mixture into the body of liquid fuel. Water in the inflowing mixture settles down through the lighter body of liquid fuel in the vertical tubular member and into the body of water disposed therebelow. Liquid fuel from which the water has thus been separated rises through the remaining perforations in the sloping diaphragm disposed nearest the liquid fuel output conduit and flows out of the device through this conduit, while water thus separated from the mixture is forced by the weight of the body of liquid fuel in the vertical tubular member down the interior thereof, and then up exteriorly thereof to leave the device through the water output conduit.

A more complete appreciation of the invention and many of the attendant advantages thereof will be readily apparent as the same becomes better understood by reference to the following detailed description when considered in connection with the accompanying drawing wherein.

Figure 1:
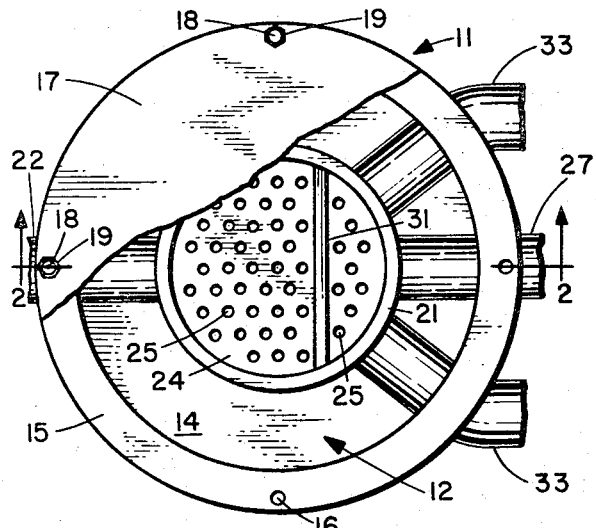
FIG. 1 is a plan view of the device according to the present invention, with the removeable cover element thereof partially broken away to show the interior thereof.
Figure 2:
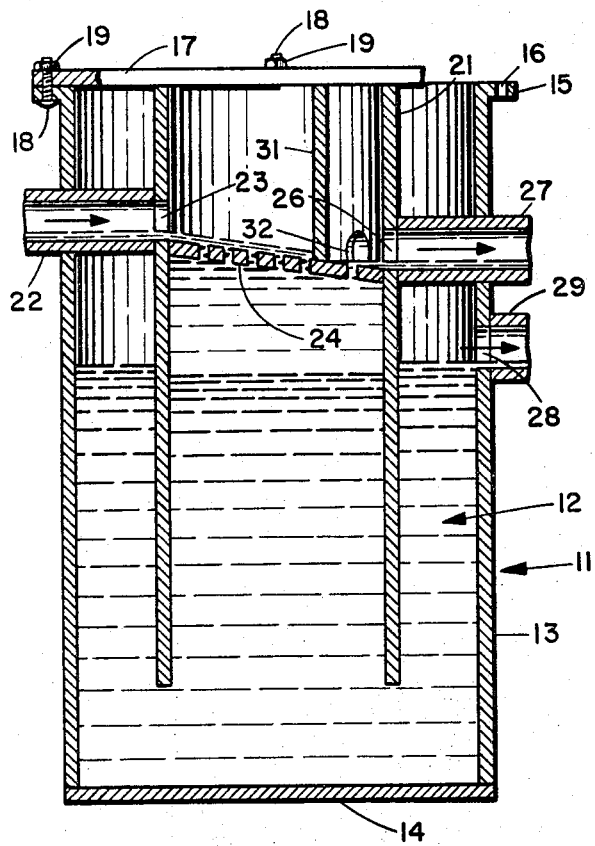
FIG. 2 is a sectional, elevational view of the device, taken along the line 2—2 of FIG. 1, and containing the bodies of liquid fuel and water operationally disposed therein.

Referring now more particularly to the drawing, wherein like reference numerals designate the same or identical parts throughout the several views, and more specifically to FIGS. 1 and 2, there is shown a device for automatically and continuously separating a high volume flow of a liquid fuel and water mixture, generally designated by the reference numeral 11. Device 11 includes a preferably metallic container adapted to hold liquids, generally designated by the reference numeral 12, having a cylindrical side wall 13 and a circular, flat lower wall 14. An outwardly extending peripheral flange 15 is integrally interconnected with the uppermost extremity of container cylindrical side wall 13, and a plurality of radially spaced vertical bores 16 are formed therethrough. A removable, circular, preferably metallic cover element 17 for container 12, substantially equal in diameter to the outer diameter of peripheral flange 15, is likewise provided with a plurality of radially spaced vertical bores formed therethrough corresponding in number and diameter to, and adapted to be aligned with, the bores 16 formed through flange 15. When cover element 17 is positioned upon flange 15 with the bores formed therethrough in alignment, externally threaded fasteners 18 are inserted in the aligned bores, and a nut 19 is turned down on each fastener 18 for securing the cover element 17 to the container 12.

The liquid fuel and water mixture separating device 11 further includes a preferably metallic, cylindrical vertical tubular member 21 having a diameter about half that of container 12. Vertical tubular member 21 is centrally disposed within container 12 and is maintained in position by the various conduits set forth hereinafter connected between the container and the vertical tubular member. Vertical tubular member 21 is open at both ends thereof, and is so suspended within container 12 that the upper end thereof substantially abuts the cover element 17 when cover element 17 is secured to container 12; the cover element 17 thereby effectively closing the upper end of vertical tubular member 21 as well as the upper end of container 12. The open lower end of vertical tubular member 21, which in length is equal to about four-fifths of the height of container 12, terminates at a distance above the lower wall 14 of container 12.

A preferably metallic, tubular liquid fuel and water mixture intake conduit 22 extends snugly through a bore formed in the side wall 13 of container 12 and terminates at the side wall of vertical tubular member 21 about an entry port 23 formed therethrough; the portions of the side wall 13 of container 12 and the side wall of vertical tubular member 21 contacting intake conduit 22 being connected thereto by welding, brazing, or other similar means for providing a strong and liquid-tight joint. The entry port 23 of vertical tubular member 21 is situated at about a quarter of the distance between the upper and the lower extremities of vertical tubular member 21.

A preferably metallic diaphragm 24 having a plurality of perforations 25 formed therethrough is transversely disposed within vertical tubular member 21 in a sloping attitude; the upper extremity of the upper surface of diaphragm 24 being disposed adjacent the lower extremity of entry port 23. The diaphragm 24 is substantially circular in planform and the edge thereof is welded, brazed, or otherwise similarly connected completely therearound to the interior surface of the side wall of vertical tubular member 21 so that liquid may pass from the upper surface to the lower surface thereof only through the perforations 25 formed therethrough. The number and the size of the perforations 25 formed through diaphragm 24, and the particular pattern in which they are arranged, are matters of design based upon the volume of flow for which the device 11 is intended.

An exit port 26 is also formed through the side wall of vertical tubular member 21 in diametrical opposition to the entry port 23 formed therethrough; the lower extremity of exit port 26 being disposed adjacent the lower extremity of the upper surface of diaphragm 24. A preferably metallic, tubular liquid fuel output conduit extends snugly through a bore formed in the side wall 13 of container 12 in diametrical opposition to the bore formed therein through which intake conduit 22 extends; the liquid fuel output conduit, designated by the reference numeral 27, terminating at the side wall of vertical tubular member 21 about the exit port 26 formed therethrough. The liquid fuel output conduit 27 is connected to the side wall 13 of container 12 and to the side wall of vertical tubular member 21 similarly to the connection of the intake conduit 22 thereto.

At a level somewhat below that of the liquid fuel output conduit 27, an exit port 28 is formed through the side wall 13 of container 12, and a terminus of a preferably metallic, tubular water output conduit 29 is connected to the exterior surface of the side wall 13 of container 12 about exit port 28 by welding, brazing, or other like means for providing a strong and liquid-tight joint.

Inasmuch as the device 11 is intended for the separation of a high volume flow of a liquid fuel and water mixture, as mentioned hereinbefore, a baffle plate 31 of preferably metallic composition is positioned within the vertical tubular member 21 above diaphragm 24 to prevent the surge of the liquid fuel and water mixture across the upper surface of diaphragm 24 and into liquid fuel output conduit 27 without first passing through the perforations 25 formed through the diaphragm 24. Baffle plate 31 is disposed transversely to the longitudinal axes of intake conduit 22 and liquid fuel output conduit 27 at about two-thirds of the distance between entry port 23 and exit port 26 of vertical tubular member 21, and in plan view, as shown in FIG. 1, forms a chord to an arcuate segment of the cylindrical side wall of vertical tubular member 21. Baffle plate 31 also extends upwardly from the upper surface of diaphragm 24 to the horizontal plane of the upper extremities of vertical tubular member 21 and container 12, and is peripherally welded, brazed, or otherwise similarly connected to the upper surface of diaphragm 24, and to the interior surface of the cylindrical side wall of vertical tubular member 21, in liquid-tight manner. It will be noted that the perforations 25 formed through diaphragm 24 lie on both sides of the baffle plate 31, as indicated in FIG. 1.

Operatively, device 11 is filled with water both interiorly and exteriorly of vertical tubular member 21 to the level of exit port 28 formed through the side wall 13 of container 12, as indicated in FIG. 2. Also, the interior of vertical tubular member 21 between the upper level of the body of water situated therein and the lower surface of diaphragm 24 is operatively filled by a body of liquid fuel, as further indicated in FIG. 2. The showing of these liquid bodies has been omitted from FIG. 1, however, solely in the interest of clarity. A high volume flow of a mixture of liquid fuel and water is pumped into the device 11 through intake conduit 22, where it spreads over the upper surface of diaphragm 24 as far as the baffle plate 31. The mixture then passes through the perforations 25 of diaphragm 24 lying between entry port 23 and baffle plate 31 into the body of liquid fuel underlying diaphragm 24; the perforated diaphragm 24 serving to assure dispersed and nonturbulent entry of the mixture thereinto. The water in the mixture, which is heavier than liquid fuel, sinks through the body of liquid fuel and passes into the body of water underlying the body of liquid fuel in tubular member 21, while the liquid fuel from which the water has thus been separated rises through the perforations 25 formed through diaphragm 24 lying between baffle plate 31 and exit port 26 and leaves the device 11 through the liquid fuel output conduit 27. The water separated from the inflowing mixture and entering the body of water situated within the vertical tubular member 21 increases the volume thereof, and water is consequently forced down the vertical tubular member 21 and then up between the outer surface thereof and the inner surface of cylindrical side wall 13 of container 12 and out of the device 11 through the water output conduit 29. The weight of the body of liquid fuel in vertical tubular member 21 may cause some slight differential in the elevations of the upper surfaces of the body of water in device 11 interiorly and exteriorly of vertical tubular member 21, as indicated in FIG. 2, but this differential is generally negligible and is of no practical concern.

As mentioned hereinbefore, a high volume flow is established in the device 11 by pumping the liquid fuel and water mixture in through intake conduit 22. As the amount of water in the incoming mixture is generally quite small in comparison with the amount of liquid fuel in the mixture, a sufficient rate of flow of water out of the device 11 through water output conduit 29 may readily be gravitationally established. Gravitational flow through liquid fuel output conduit 27, which is usually equal in diameter to intake conduit 22, would, under such circumstances, be insufficient to clear the device 11 of liquid fuel. While pump means may be utilized to establish a rate of flow of liquid fuel in output conduit 27 substantially equal to the rate of flow of the liquid fuel and water mixture in intake conduit 22, it may also be desirable to eliminate the necessity of providing such pump means. Accordingly, additional exit ports 32 may be formed through the cylindrical side wall of vertical tubular member 21 adjacent the upper surface of diaphragm 24 and in fairly close proximity to exit port 26; the baffle plate 31 also being interposed between the entry port 23 and the additional exit ports 32. Preferably metallic, tubular auxiliary liquid fuel output conduits 33 may extend snugly through bores formed in the side wall 13 of container 12; each auxiliary liquid fuel output conduit 33 terminating at the side wall of vertical tubular member 21 about one of the additional exit ports 32 formed therethrough. The auxiliary liquid fuel output conduits 33 are each connected to the side wall 13 of container 12 and to the side wall of vertical tubular member 21 similarly to the connection of the intake conduit 22 and the liquid fuel output conduit 27 thereto. It has been found that gravitational flow through one output conduit 27 and two auxiliary output conduits 33 for liquid fuel, all substantially equal in diameter to the diameter of the liquid fuel and water mixture intake conduit 22, as shown in the drawing, is generally sufficient to clear the device 11, as hereinbefore described, of liquid fuel from which the water has thus been separated.

Figure 3:
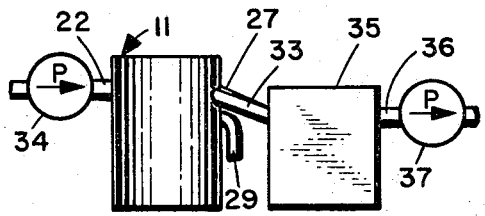
FIG. 3 is a somewhat schematic, side elevational view of a system incorporating the device according to the instant invention.
Figure 4:
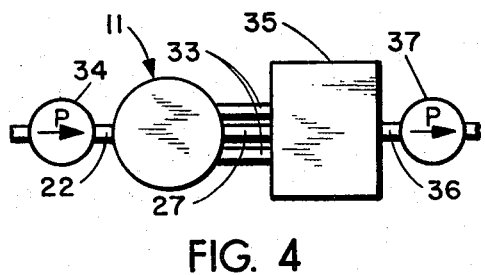
FIG. 4 is a plan view of the system shown in FIG. 3.

A system in which a device for separating a high volume flow of a liquid fuel and water mixture, such as the device 11 hereinbefore described, is illustrated in FIGS. 3 and 4 of the drawing. Such a system may be utilized, by way of example, in the discharge of the cargo tanks of a marine tanker vessel, in which case it would preferably be designed for a flow of from one thousand to two thousand gallons per minute and, being large and heavy, would probably be permanently installed on a pier or the like capable of accomodating such a vessel. More particularly, the system includes a pump 34 interconnected with the liquid fuel and water intake conduit 22 leading into the separating device 11. The water separated from the mixture leaves the device 11 through the water output conduit 29 for disposal, while the liquid fuel separated from the mixture leaves the device 11 through the liquid fuel output conduit 27 and the two auxiliary liquid fuel output conduits 33 and flows under the influence of gravity, as indicated in FIG. 3, into a liquid fuel storage tank 35. A storage tank output conduit 36, with which a pump 37 is interconnected, is provided for discharging liquid fuel from the storage tank 35.

Each of the pumps 34 and 37 are driven by an individual electric motor, not illustrated. In the event that liquid fuel storage tank 35 is filled to capacity, or near capacity, it would obviously be highly undesirable for the pump 34 to continue to introduce the liquid fuel and water mixture into the system while the motor for driving the pump 37, for any reason, is incapable of operating. Accordingly, the motors for driving the pumps 34 and 37 are electrically interlinked in such a way that, in the event of the failure of the motor driving the pump 37, the motor for driving the pump 34 will automatically be shut down. Such an electrical interlinkage of a pair of electric motors is conventional and is therefore not illustrated in the drawing; such electrical interlinkages being shown, for example, in FIG. 10, page 226, and in FIG. 12, page 227, of Audels Questions and Answers for Electricians Examinations (Cat. No. AUD–34), by Edwin P. Anderson, revised and updated by Roland E. Palmquist, second edition, first printing, January 1965, published by Theodore Audel and Co., a division of Howard W. Sams and Co., Inc., Minneapolis and New York, Library of Congress Cat. Card No.: 64–8060.

The liquid fuel and water mixture separating device may also be designed for a low volume flow of the mixture. Such a device may be placed in the conduit extending between a liquid fuel reservoir and the furnace or heater installed in a dwelling house, for example, through which liquid fuel flows under the influence of gravity. In such a low volume of flow device the auxiliary liquid fuel output conduits 33 provided in a high volume flow device such as the device 11 hereinbefore set forth may be eliminated as unnecessary. Further, in such a low volume flow device, the baffle plate 31 required in a high volume flow device such as the device 11 may also be eliminated as unnecessary, since a small amount of liquid flowing out onto the perforated diaphragm thereof will completely sink through the perforations formed therethrough before it reaches the liquid fuel output conduit thereof.

In the event that such a low volume flow liquid fuel and water mixture separating device is placed in the fuel supply line of a vehicle, such as an automobile, where the liquid contents thereof would reasonably be expected to slosh around, if permitted, a transverse plate, not illustrated, may be positioned between the exterior surface of the cylindrical side wall of the vertical tubular member thereof and the interior surface of the cylindrical side wall of the container thereof at a level between that of the liquid fuel output and the water output conduits thereof. This tranverse plate, by maintaining the body of water situated therein about as illustrated in FIG. 2, serves to keep the device operating as hereinbefore contemplated.

Obviously, many modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A device for separating a flowing mixture of liquid fuel and water, comprising:
 (a) a container for liquids;
 (b) an open ended vertical tubular member centrally suspended within said container, the open upper extremity of said vertical tubular member being disposed at about the level of the upper extremity of said container and the open lower extremity of said vertical tubular member being disposed above the lower extremity of said container;
 (c) a liquid fuel and water mixture intake conduit extending through a side wall of said container and connected to a side wall of said vertical tubular member for fluid communication with the interior of said vertical tubular member;
 (d) a liquid fuel output conduit extending through a side wall of said container and connected to a side wall of said vertical tubular member for fluid communication with the interior of said vertical tubular member at a point somewhat lower and substantially diametrically opposed to the point of connection of said intake conduit to said vertical tubular member;
 (e) a water output conduit connected to a side wall of said container for fluid communication with the interior thereof at a point below the level of said liquid fuel output conduit; and
 (f) a perforated diaphragm transversely disposed within said vertical tubular member in a sloping attitude, the upper extremity of the upper surfaces of said diaphragm being disposed adjacent the point of connection of said intake conduit with said vertical tubular member, and the lower extremity of the upper surface of said diaphragm being disposed adjacent the point of connection of said liquid fuel output conduit with said vertical tubular member.

2. The device according to claim 1, including a removable cover element for simultaneously closing the upper end of said container and the upper end of said vertical tubular member.

3. The device according to claim 1, including a baffle plate transversely disposed within said vertical tubular member between the points of connection of said intake conduit and said liquid fuel output conduit therewith, said baffle plate extending upwardly from said upper surface of said diaphragm toward the upper extremity of said vertical tubular member.

4. The device according to claim 3, wherein said baffle plate is situated more remotely from the point of connection of said intake conduit with said vertical tubular member than from the point of connection of said liquid fuel output conduit with said vertical tubular member.

5. The device according to claim 3, including at least one auxiliary fuel output conduit extending through a side wall of said container and connected to a side wall of said vertical tubular member for fluid communication with the interior of said vertical tubular member at a point closely proximate to and on the same side of said baffle plate as the connection of said liquid fuel output conduit with said vertical tubular member.

6. The device according to claim 5, including a removeable cover element for simultaneously closing the upper end of said container and the upper end of said vertical tubular member.

7. The device according to claim 5, wherein said baffle plate is situated more remotely from the point of connection of said intake conduit with said vertical tubular member than from the point of connection of said liquid fuel output conduit with said vertical tubular member.

8. The device according to claim 7, including a removeable cover element for simultaneously closing the upper end of said container and the upper end of said vertical tubular member.

9. A system for effecting the separation of a flowing mixture of liquid fuel and water, comprising:
 (A) a device including
  (a) a container for liquids;
  (b) an open ended vertical tubular member centrally suspended within said container, the open upper extremity of said vertical tubular member being disposed at about the level of the upper extremity of said container and the open lower extremity of said vertical tubular member being disposed above the lower extremity of said container;
  (c) a liquid fuel and water mixture intake conduit extending through a side wall of said container and connected to a side wall of said vertical tubular member for fluid communication with the interior of said vertical tubular member;
  (d) a liquid fuel output conduit and a pair of auxiliary liquid fuel output conduits extending through a side wall of said container and connected to a side wall of said vertical tubular member for fluid communication with the interior of said vertical tubular member at points somewhat lower than and substantially diametrically opposed to the point of connection of said intake conduit with said vertical tubular member;
  (e) a water output conduit connected to a side wall of said container for fluid communication with the interior thereof at a point below the level of said liquid fuel output conduit and said auxiliary liquid fuel output conduits;
  (f) a perforated diaphragm transversely disposed within said vertical tubular member in a sloping attitude, the upper extremity of the upper surface of said diaphragm being disposed adjacent the point of connection of said intake conduit with said vertical tubular member, and the lower extremity of the upper surface of said diaphragm being disposed adjacent the points of connection of said liquid fuel output conduit and said auxiliary liquid fuel output conduits with said vertical tubular member; and
  (g) a baffle plate transversely disposed within said vertical tubular member between the point of connection of said intake conduit and the points of connection of said liquid fuel output conduit and said auxiliary liquid fuel output conduits with said vertical tubular member, said baffle plate extending upwardly from the upper surface of said diaphragm toward the upper extremity of said vertical tubular member;
 (B) a pump for forcing a liquid fuel and water mixture through said intake conduit into said device;
 (C) a liquid fuel storage tank for receiving the liquid fuel output of said device, the extremities of said liquid fuel output conduit and said auxiliary liquid fuel output conduits remote from said device being connected to said liquid fuel storage tank for fluid communication with the interior thereof;
 (D) a liquid fuel storage tank output conduit connected to said liquid fuel storage tank for fluid communication with the interior thereof; and
 (E) a pump for forcing liquid fuel through said liquid fuel storage tank output conduit in the direction away from said liquid fuel storage tank.

10. The device according to claim 9, including a removeable cover element for simultaneously closing the upper end of said container and the upper end of said vertical tubular member.

References Cited

UNITED STATES PATENTS

| 1,326,039 | 12/1919 | Dunwody | 210—84 |
| 1,688,152 | 10/1928 | Pierson | 210—305 X |
| 1,702,613 | 2/1929 | Morse | 210—84 X |

FOREIGN PATENTS

| 9,786 | 5/1895 | Great Britain | 210—305 |

REUBEN FRIEDMAN, *Primary Examiner.*

J. ADEE, *Examiner.*